United States Patent [19]

Carter

[11] 4,327,986
[45] May 4, 1982

[54] MOBILE CAMERA SUPPORT

[76] Inventor: Rhonda Carter, 520 Van Buren Ave., #301, Oakland, Calif. 94610

[21] Appl. No.: 196,255

[22] Filed: Oct. 10, 1980

[51] Int. Cl.³ .................... G03B 17/00; G03B 29/00
[52] U.S. Cl. .................................... 354/293; 354/82
[58] Field of Search ........................ 354/81, 82, 293; 352/243

[56] References Cited

U.S. PATENT DOCUMENTS

| | | | |
|---|---|---|---|
| 817,207 | 4/1906 | Wheeler | 354/82 X |
| 2,658,435 | 11/1953 | Sarvoy | 354/82 X |
| 2,673,502 | 3/1954 | Skodock | 354/82 X |
| 2,763,456 | 9/1956 | Breer | 354/82 X |
| 3,966,101 | 6/1976 | Taylor | 354/293 X |
| 4,244,500 | 1/1981 | Fournier | 354/81 X |

*Primary Examiner*—Donald A. Griffin
*Attorney, Agent, or Firm*—Bielen and Peterson

[57] ABSTRACT

A mobile camera support utilizing a shaft which includes a mount for the camera. A first and second leg pivotally attaches to the shaft and extends away from the same about the sides of the user. The shaft is held to the torso of the user by a strap or other mechanism at a point spaced from the pivotal connection of the first and second legs to the shaft.

7 Claims, 5 Drawing Figures

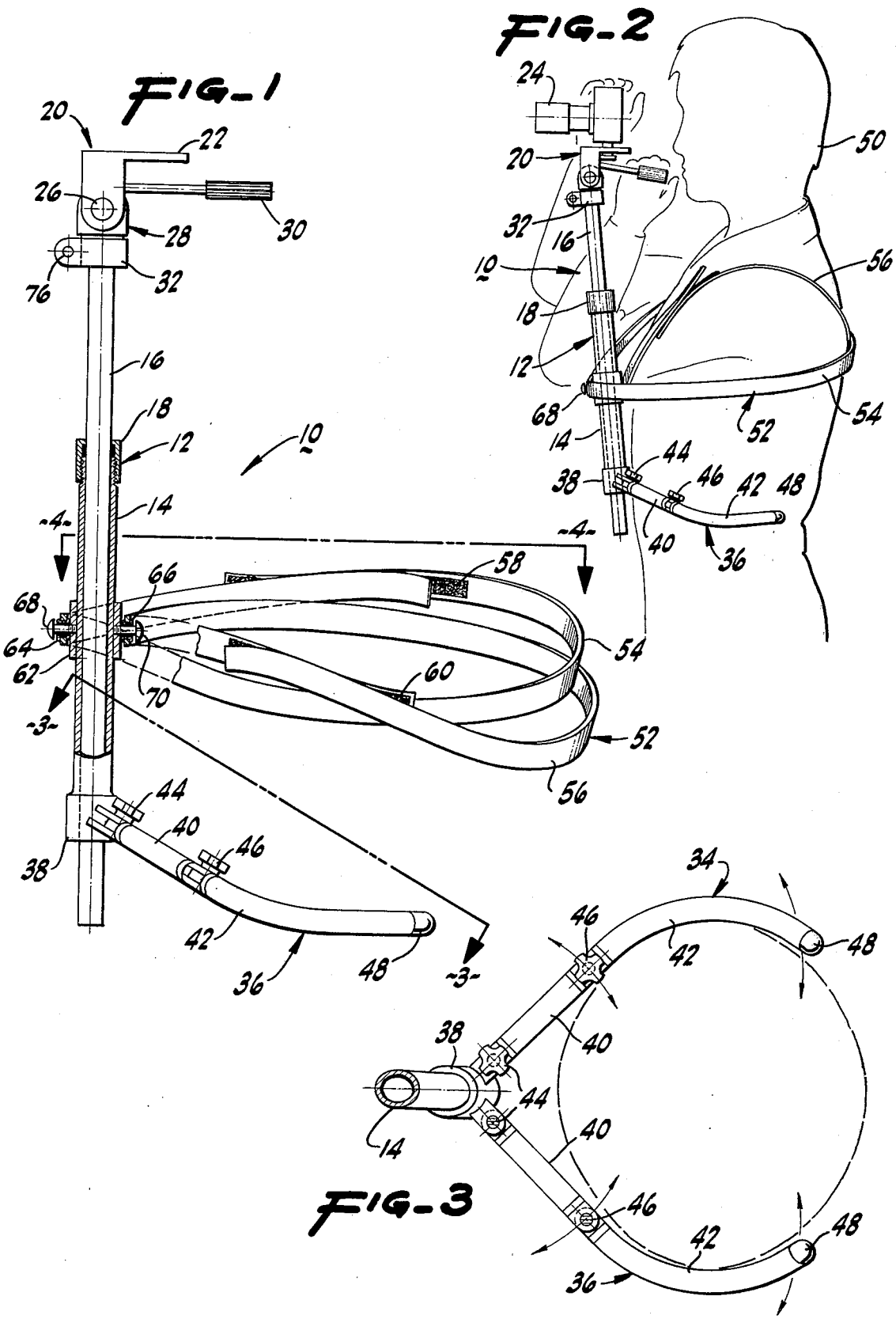

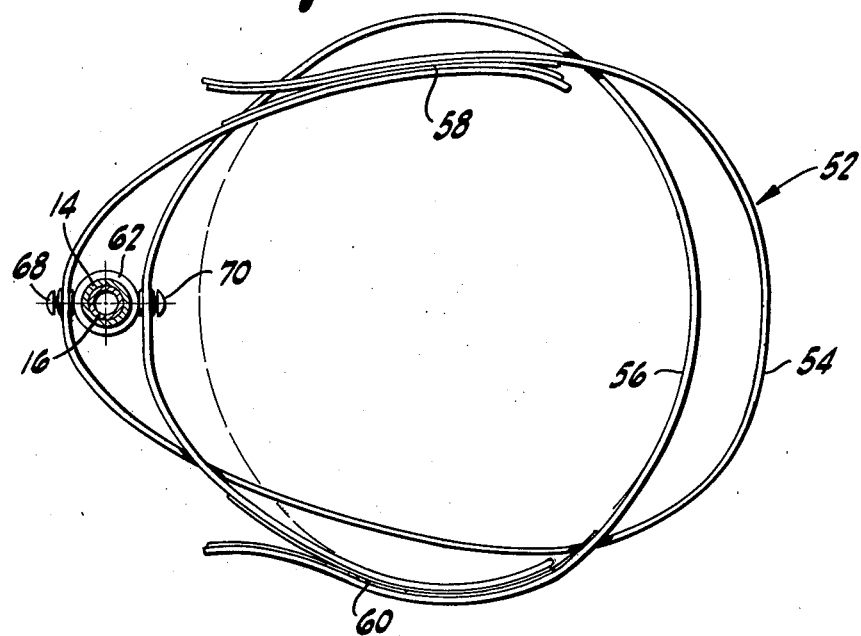
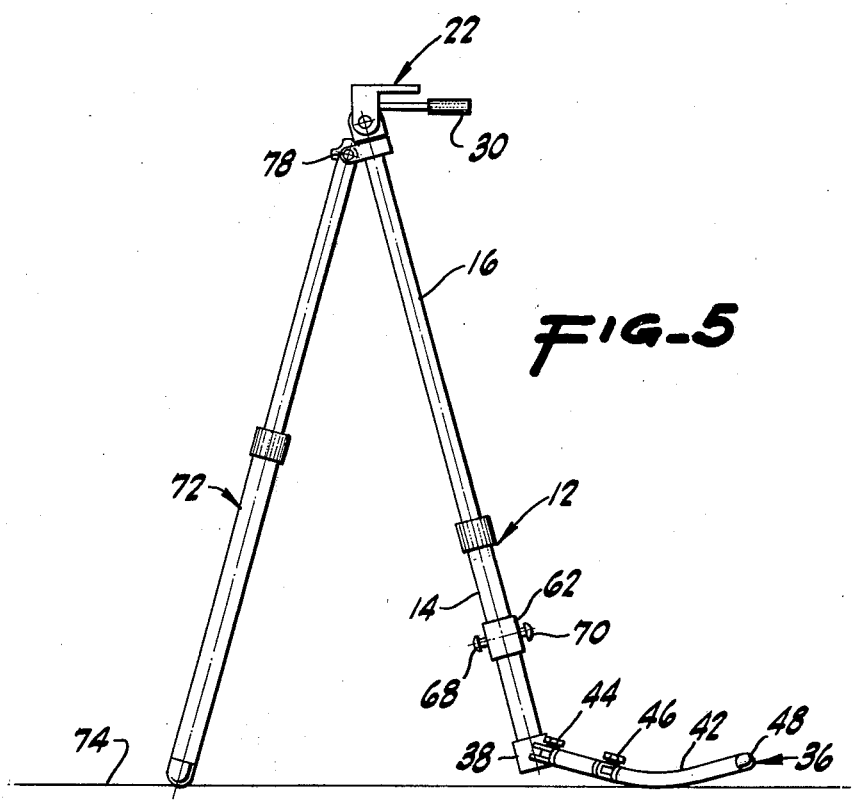

MOBILE CAMERA SUPPORT

BACKGROUND OF THE INVENTION

The present invention relates to a novel camera supporting device.

It has been the experience of many camera enthusiasts that the use of a tripod during picture taking activities results in the production of superior photographs. This is true because of the fact that a camera must be held without movement while clicking the shutter mechanism. The use of a tripod is mandatory in many situations where the light level is quite low.

Tripods of conventional design are cumbersome and do not permit the user to quickly approach the view finder when taking the photograph, since the tripod must be placed on a firm surface and the camera attached thereto must be moved to the proper position.

A camera support which employs the steadying characteristics of a tripod but permits the user to quickly photograph a particular scene would be very useful in the photographic field.

SUMMARY OF THE INVENTION

In accordance with the present invention a novel and useful mobile camera support is provided.

The mobile camera support of the present invention employs a shaft having mounting means for the camera. Such mounting means may be of a universal type which permits full turning of the camera in any direction and also allows the user to fix the camera in the desired position for a particular snapshot. The shaft may rotate on its axis and include a telescopic means for extending or shortening the same. Again, the shaft may be fixed at various lengths and at various angles around its axis of rotation.

A first and second leg pivotally connect to the shaft and extend away from the same about the lateral portions of the user, i.e. the waist, hips, and the like. Each leg may include an articulated section which is itself pivotally mounted to the leg. The articulated section may be curved to better engage the side portions of the user.

In addition, the mobile camera support of the present invention may include means for holding the shaft to the torso of the user. Such holding means may be connected to the shaft in at least one place which spaces from the pivotal connection of the first and second legs along the length of the shaft. Such holding means may take the form of a strap which generally fits around the shoulders of the user. The strap may be adjustable to fit various sized users.

It may be apparent that a novel and useful camera support has been described.

It is therefore an object of the present invention to provide a mobile camera support which permits the user to obtain photographs which are of superior quality.

It is another object of the present invention to provide a mobile camera support which aids the user in steadying the camera before enduring the photograph process without encumbering the user's arms or legs.

It is yet another object of the present invention to provide a mobile camera support which is attached to the user's body and is adjustable to fit various sized individuals.

It is another object of the present invention to provide a mobile camera support which is borne by the user without the use of the user's arms and legs, thus leaving the same free to photograph objects and scenes in various places quickly and efficiently.

The invention possesses other objects and advantages especially as concerns particular characteristics and features thereof, which will become apparent as the specification continues.

BRIEF DESCRIPTION OF THE DRAWINGS

FIG. 1 is a side elevational view of the device having a broken away section.

FIG. 2 is a side elevational view of the device in use.

FIG. 3 is a sectional view taken along line 3—3 of FIG. 1.

FIG. 4 is a sectional view taken along line 4—4 of FIG. 1.

FIG. 5 is a side elevational view of the camera support showing an embodiment which may be used as a tripod.

For a better understanding of the invention, reference is made to the following detailed description which should be referenced to the hereinabove described drawings.

DESCRIPTION OF THE PREFERRED EMBODIMENTS

Various aspects of the present invention will evolve from the following detailed description of the preferred embodiments thereof, which should be taken in conjunction with the hereinabove described drawings.

The invention as a whole is represented in the drawings by reference character 10. With reference to FIG. 1, the device 10 includes as one of its elements a shaft 12 which is telescopically adjustable. Shaft 12 includes a first hollow section 14 which slidingly engages a second section 16. A tightening nut 18 fixes the position of a first section 14 in relation to second section 16, thereby adjusting the length of shaft 12. On the upper portion of shaft 12 may be found a camera mount 20 of conventional design. Mount 20 includes a platform 22 which holds the camera 24, FIG. 2, in place. Platform 22 includes a pivot 26 and a universal joint 28. Handle 30 fixes the camera in any orientation desired. Strap 32 holds mount 20 to shaft 12. Shaft 12 may be constructed of any generally rigid material such as aluminum, wood, plastic, and the like.

The camera support 10 also includes first leg 34 and second leg 36 which are pivotally attached to shaft 12. First and second legs 34 and 36 pivotally mount to shaft 12. More specifically, a collar 38 is fitted about first hollow portion 14 below platform 22. By exemplar, leg 36 includes a first portion 40 and a curved second portion 42, FIGS. 1-3. Leg 34 includes the identical components of leg 36 as described herein. First portion 40 attaches to collar 38 via joint 44. Second curved portion 42 of leg 36 attaches to first straight portion 40 of leg 36 via joint 46. Joints 44 and 46 permit the rotation of first and second portions 40 and 42 as well as pivotal motion, between collar 38 and first portion 40 and between first and second portions 40 and 42. End portion 42 includes a cap 48 to prevent abrasion or injury to the user 50, FIG. 2. Second curved portion 42 may be described as an articulated section which permits the adjustment of leg 36 to the particular size of the user 50.

The mobile camera support of the present invention also includes means 52 for holding shaft 12 to the torso of the user 50. In the embodiments shown in the drawings, FIGS. 1–4, means 52 takes the form of a pair of flexible straps 54 and 56. Each strap is adjustable by the use of hook and pile mechanisms 58 and 60. Of course, other means such as buckles, cinches, and the like may be used to adjust the size of straps 54 and 56. Both straps affix to shaft 12 between platform 22 and legs 34 and 36. As shown in FIG. 1, a bushing 62 fits over hollow portion 14 of shaft 12. A pair of nuts 64 and 66 are fastened to bushing 62 and accept threaded machine screws 68 and 70, which pinion straps 54 and 56. Straps 54 and 56 may take many configurations such as those resembling a conventional pair of suspenders. In the embodiment shown in FIGS. 1, 2 and 4, means 52 substantially surrounds the torso of the user 50, strap 54 passing under the left armpit and over the right shoulder of the user and strap 56 passing under the right armpit and over the left shoulder of the user. Thus, a crisscross pattern appears on the back portion of the user 50.

Another leg 72 may be added to the device 10 such that it may be used as a conventional tripod, FIG. 5. In such a case, legs 34 and 36 would provide two points of contact with ground surface 74 to form the tripod effect. It should be noted that strap 32 provides a point of attachment for leg 72 such that opening 76 serves as a pivot point. Fastening means 78 would permit the pivoting of leg 72 as desired.

In operation, the user, FIG. 2, places camera 24 on platform 22 and adjusts the length of second part 16 of shaft 12 such that camera 24 is at eye level. Legs 34 and 36 are placed about the waist of the user 50 and adjusted to snuggly fit therearound. Straps 54 and 56 are fastened to the user in crisscross fashion and adjusted by the use of hook and pile portions 58 and 56 to stabilize the movement of platform 22 and camera 24 thereupon. At this point, the user has both hands free to operate the camera and the platform, the same being supported by device 10 on the shoulders and hip portions of the user. Thus, user 50 is available to obtain photographs as if a tripod were being used without the disadvantage of time delay in setting up a conventional tripod.

While in the foregoing embodiments of the present invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A mobile camera support comprising:
 a. a shaft having mounting means for the camera;
 b. a first and a second leg pivotally mounted to said shaft, each leg extending away from said shaft, said first leg including a first section and a second section connected to said first section, said second section extending along the waist of the user for support on the hip of the user;
 c. means for holding said shaft to the torso of the user, said holding means being connected to said shaft in at least one place which is spaced along said shaft from said pivotal connection of said first and second legs.

2. The mobile camera support of claim 1 in which said first and second sections of said first leg are articulated sections pivotally connected to each other.

3. The mobile camera support of claim 2 in which said second leg includes a first section and a second section connected to said first section, said second section extending along the waist of the user for support on the hip of the user, said first and second sections of said second leg are articulated sections pivotally connected to each other.

4. The mobile camera support of claim 3 in which said second sections of said first and second legs have a curved configuration.

5. The mobile camera support of claim 4 in which said means for holding said shaft to the torso of the user comprises a flexible strap which substantially surrounds the torso of the user.

6. The mobile camera support of claim 5 which further comprises means for adjusting the length of said shaft.

7. The mobile camera support of claim 6 which further comprises means for adjusting the length of said flexible strap.

* * * * *